United States Patent
Mao et al.

(10) Patent No.: US 10,469,404 B1
(45) Date of Patent: Nov. 5, 2019

(54) NETWORK MULTI-LEVEL RATE LIMITER

(71) Applicant: Google LLC, Mountain View, CA (US)

(72) Inventors: Yuhong Mao, Fremont, CA (US); Richard Lee Sites, Menlo Park, CA (US); Jeffrey Clifford Mogul, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 356 days.

(21) Appl. No.: 14/632,598

(22) Filed: Feb. 26, 2015

Related U.S. Application Data (60) Provisional application No. 61/991,855, filed on May 12, 2014, provisional application No. 61/991,858, filed on May 12, 2014.

(51) Int. Cl.
*G06F 15/173* (2006.01)
*H04L 12/911* (2013.01)
*H04L 29/08* (2006.01)

(52) U.S. Cl.
CPC ............ *H04L 47/783* (2013.01); *H04L 67/16* (2013.01); *H04L 67/322* (2013.01)

(58) Field of Classification Search
CPC ...... H04L 47/783; H04L 67/322; H04L 67/16
See application file for complete search history.

(56) References Cited

U.S. PATENT DOCUMENTS

| | | | |
|---|---|---|---|
| 5,448,559 A | * | 9/1995 | Hayter ............... H04L 12/5602 370/398 |
| 5,996,019 A | * | 11/1999 | Hauser .............. G06F 15/17375 370/429 |
| 6,104,700 A | * | 8/2000 | Haddock ................ H04L 47/10 370/235 |

(Continued)

FOREIGN PATENT DOCUMENTS

| | | |
|---|---|---|
| WO | 2013158115 A1 | 10/2013 |
| WO | 2014021839 A1 | 2/2014 |

OTHER PUBLICATIONS

Broadcom Ethernet Network Controller Enhanced Virtualization Functionality, Broadcom Corporation, Oct. 2009.

(Continued)

*Primary Examiner* — Suraj M Joshi
*Assistant Examiner* — Jaren Means
(74) *Attorney, Agent, or Firm* — Lerner, David, Littenberg, Krumholz & Mentlik, LLP (57) ABSTRACT

The present application describes a system and method for rate limiting traffic of network users, such as virtual machines (VMs). In accordance with the disclosure, transmission queues for the VMs may be assigned to two levels of rate limiting. The first-level rate limit may be an individual rate limit for a particular transmission queue, while the second-level rate limit may be a group rate limit that is applied to a group of transmission queues. The first-level rate limit for some transmission queues may be performed using software rate limiting, while for other transmission queues the first-level rate limit may be performed using hardware rate limiting. The second-level rate limit may be applied to a group of transmission queues that contains both software first-level rate limited transmission queues and hardware first-level rate limited transmission queues.

19 Claims, 6 Drawing Sheets

(56) References Cited

U.S. PATENT DOCUMENTS

| | | | |
|---|---|---|---|
| 6,785,252 B1* | 8/2004 | Zimmerman | H04W 72/10 370/337 |
| 6,952,401 B1 | 10/2005 | Kadambi et al. | |
| 6,956,818 B1* | 10/2005 | Thodiyil | H04L 47/522 370/230 |
| 6,987,733 B2 | 1/2006 | Mukouyama et al. | |
| 7,133,399 B1* | 11/2006 | Brewer | H04L 45/00 370/360 |
| 7,382,728 B2 | 6/2008 | Chen et al. | |
| 7,539,134 B1 | 5/2009 | Bowes | |
| 7,636,308 B2 | 12/2009 | Kwon | |
| 8,462,780 B2 | 6/2013 | Vincent et al. | |
| 8,477,610 B2 | 7/2013 | Zuo et al. | |
| 8,499,151 B2 | 7/2013 | Durham et al. | |
| 8,520,522 B1* | 8/2013 | Goldman | H04L 47/26 370/235 |
| 8,566,822 B2 | 10/2013 | Diab et al. | |
| 8,599,830 B2 | 12/2013 | Karaoguz et al. | |
| 9,172,655 B1* | 10/2015 | Dropps | H04L 47/6215 |
| 2002/0097733 A1* | 7/2002 | Yamamoto | H04L 45/00 370/412 |
| 2002/0181484 A1* | 12/2002 | Aimoto | H04L 47/10 370/413 |
| 2002/0194361 A1* | 12/2002 | Itoh | H04L 1/0002 709/233 |
| 2003/0123390 A1* | 7/2003 | Takase | H04L 12/5602 370/230.1 |
| 2004/0081093 A1* | 4/2004 | Haddock | H04L 47/10 370/230 |
| 2004/0090974 A1* | 5/2004 | Balakrishnan | H04L 47/10 370/412 |
| 2004/0160914 A1* | 8/2004 | Sarkar | H04W 72/1226 370/329 |
| 2004/0196788 A1* | 10/2004 | Lodha | H04L 47/22 370/230 |
| 2005/0122966 A1 | 6/2005 | Bowes | |
| 2007/0061433 A1* | 3/2007 | Reynolds | H04L 41/0806 709/223 |
| 2007/0195817 A1* | 8/2007 | Denney | H04J 3/1682 370/468 |
| 2008/0259798 A1* | 10/2008 | Loh | H04L 45/302 370/235 |
| 2010/0027426 A1* | 2/2010 | Nair | H04W 28/16 370/238 |
| 2010/0061235 A1* | 3/2010 | Pai | H04L 12/2801 370/230.1 |
| 2010/0211946 A1 | 8/2010 | Elzur | |
| 2011/0019531 A1 | 1/2011 | Kim et al. | |
| 2011/0019552 A1 | 1/2011 | Karaoguz et al. | |
| 2011/0023029 A1 | 1/2011 | Diab et al. | |
| 2011/0096689 A1* | 4/2011 | Sindhu | H04L 41/0896 370/252 |
| 2011/0103389 A1 | 5/2011 | Kidambi et al. | |
| 2012/0076149 A1* | 3/2012 | Ko | H04L 12/433 370/395.53 |
| 2012/0250511 A1 | 10/2012 | Neeser | |
| 2013/0003538 A1* | 1/2013 | Greenberg | H04L 47/623 370/230 |
| 2013/0019042 A1 | 1/2013 | Ertugay et al. | |
| 2013/0227685 A1 | 8/2013 | McGee | |
| 2013/0246619 A1 | 9/2013 | Raja et al. | |
| 2013/0343191 A1* | 12/2013 | Kim | H04L 47/11 370/235 |
| 2013/0343399 A1 | 12/2013 | Kandula et al. | |
| 2014/0115578 A1 | 4/2014 | Cooper et al. | |
| 2014/0250486 A1* | 9/2014 | Sze | H04W 76/15 725/127 |
| 2015/0124607 A1* | 5/2015 | Kotecha | H04W 72/1242 370/235 |
| 2015/0146527 A1 | 5/2015 | Kishore et al. | |
| 2016/0044695 A1 | 2/2016 | Gunner | |
| 2016/0301601 A1 | 10/2016 | Anand et al. | |

OTHER PUBLICATIONS

Keller, Eric, et al., NoHype: Virtualized Cloud Infrastructure without the Virtualization, Princeton University, ® 2010.

Mogul, Jeffrey C., et al., The NIC is the Hypervisor: Bare-Metal Guests in IaaS Clouds, HP Labs, Palo Alto, 2013.

Radhakrishnan, et al., NicPic: Scalable and Accurate End-Host Rate Limiting, 2013.

Radhakrishnan, et al., SENIC: Scalable NIC for End-Host Rate Limiting, 2013.

Ram, Kaushik Kumar, et al., sNICh: Efficient Last Hop Networking in the Data Center, HP Laboratories, © 2010.

\* cited by examiner

NETWORK MULTI-LEVEL RATE LIMITER

CROSS-REFERENCE TO RELATED APPLICATIONS

The present application claims the benefit of the filing date of U.S. Provisional Application No. 61/991,858, filed on May 12, 2014, and No. 61/991,855, filed on May 12, 2014, the disclosures of which are herein incorporated by reference in their entirety. This application is related to commonly owned co-pending U.S. patent application Ser. No. 14/632,449, entitled "Method and System and Validating Rate-Limiter Determination Made by Untrusted Software," filed Feb. 26, 2015, and Ser. No. 14/632,464, entitled "Method and System for Enforcing Multiple Rate Limits with Limited On-Chip Buffering," filed Feb. 26, 2015, the disclosures of which are hereby incorporated by reference in their entirety.

BACKGROUND OF THE INVENTION

In systems that include a plurality of virtual machine environments, trusted host software, such as a hypervisor or virtual machine manager, may be used to manage network resources. These virtual machines may be required to share network bandwidth. In order to enforce bandwidth sharing amongst the virtual machines, a trusted host may implement rate limiting.

Rate limiting is a technique used to limit traffic sent and received by the virtual machines. In particular, there are two types of rate-limiting: hardware rate limiting and software rate limiting. Hardware rate limiting may be performed by a network interface controller (NIC), while software rate limiting may be performed by a hypervisor.

SUMMARY OF THE INVENTION

A system and method for implementing two-level rate limiting is disclosed, which may include: receiving, by one or more processors, transmission requests for a plurality of transmission queues; assigning, by the one or more processors, a first set of transmission queues, from the plurality of transmission queues, to a first group; identifying, by the one or more processors, an individual bandwidth limit for each transmission queue in the first group; determining, by the one or more processors, whether each transmission queue in the first group is of a bandwidth that is within the transmission queues identified individual bandwidth limit; identifying, by the one or more processors, a first group-level bandwidth limit for the first group of transmission queues; determining, by the one or more processors, whether the first group of transmission queues is of a total bandwidth that is within the first group-level bandwidth limit; if the bandwidth for each transmission queue from the first group is within the transmission queue's individual bandwidth limit and if the first group of transmission queues has a total bandwidth that is within the first group-level bandwidth limit, providing, by the one or more processors, the first group of transmission queues for transmission.

The disclosed system and method may also include: assigning, by the one or more processors, a second set of transmission queues, from the plurality of transmission queues, to a second group; identifying, by the one or more processors, an individual bandwidth limit for each of the transmission queues in the second group; determining, by the one or more processors, whether each transmission queue in the second group of transmission queues is of a bandwidth that is within the transmission queue's identified individual bandwidth limit; identifying, by the one or more processors, a second group-level bandwidth limit for the second group of transmission queues; determining, by the one or more processors, whether the second group of transmission queues has a total bandwidth that is within the second group-level bandwidth limit; if the bandwidth for each transmission queue from the first group is within the transmission queue's identified individual bandwidth limit and if the total bandwidth of the second group of transmission queues is within the second group-level bandwidth limit, providing, by the one or more processors, the second group of transmission queues for transmission.

In another aspect, the summation of the individual bandwidth limits for the transmission queues in the first group may be greater than the first group-level bandwidth limit. In addition, the first group of transmission queues may be associated with a first network user, and the second group of transmission queues may be associated with a second network user. The first group of transmission queues may also contain a different number of transmission queues than the second group of transmission queues.

In another aspect of the disclosed method, the system and method may also include arbitrating, by the one or more processors, between the first group of transmission queues and the second group of transmission queues based on one of a weighted round robin (WRR) and deficit weighted round robin (DWRR). The first group of transmission queues may be associated with a first virtual machine or a first program, and the second group of transmission queues may be associated with a second virtual machine or a second program.

The disclosed system and method may also include determining, with the one or more processors, whether the bandwidth for each transmission queue from the first group is within the transmission queue's individual bandwidth limit further comprises assigning each transmission queue from the first group with a first pointer to a first-level rate limiter; and wherein determining whether the first group of transmission queues has a total bandwidth that is within the first group-level bandwidth limit further comprises assigning each transmission queue from the first group with a second pointer to a second-level rate limiter. The first-level rate limiter and the second-level rate limiter may be hardware or software implemented rate limiters. In accordance with another aspect, at least a first transmission queue from the plurality of transmission queues is assigned a software implemented first-level rate limiter, and at least a second transmission queue from the plurality of transmission queues is assigned to a hardware implemented first-level rate limiter. The first transmission queue and second transmission queue may also be assigned to the same group, such as the first group.

In yet another aspect, the disclosed system may include one or more memories for storing a plurality of transmission queues, and one or more processors in communication with the one or more memories. The one or more processors configured to perform the operations set forth herein. In yet another aspect, a non-transitory computer readable medium may include instructions, that when executed by one or more processors perform the various operations set forth herein.

DETAILED DESCRIPTION

The present disclosure relates to the transmission of data over a network. In particular, the disclosed system and methods may limit how much bandwidth a particular network connection may use at a given time by grouping a set of network connections together and implementing an aggregate bandwidth limit. For example, each network user may be granted a set of network connections, along with a total bandwidth limit.

In accordance with the disclosure, a bandwidth limit for a particular transmission queue may be enforced using two sets of rate limiters. For example, bandwidth limits for a set of transmission queues may be enforced by a network interface card (NIC) that includes a first-level rate limiter and a second-level rate limiter. The first-level rate limiter enforces an individual bandwidth limit for each transmission queue, while the second-level rate limiter enforces a group-level bandwidth limit for a group of transmission queues. The group-level bandwidth limit may be less than the aggregate individual bandwidth limits permitted by the first-level rate limiter. For example, a group of eight transmission queues may each have individual bandwidth limits of 0.5 Gigabits-per-second, while the entire group of eight transmission queues may be given a group-level bandwidth limit of 2 Gigabits-per-second.

In one aspect, the transmission queues may be assigned to groups having an arbitrary number of queues. This may be accomplished by pointers being assigned to each transmission queue. In particular, a first pointer may assign a transmission queue to the first-level rate limiter, while a second pointer assigns the transmission queue to the second-level rate limiter. The second pointer may therefore indicate the group in which the transmission queue is to be included. Using the assigned pointers, the first-level rate limiter may determine if the transmission queue is within some individual bandwidth limit, while the second-level rate limiter may determine whether the transmission queue's group is within the assigned group-level bandwidth limit. In order for a packet to be transmitted from a particular transmission queue, the first-level rate limiter and second-level rate limiter must indicate that the transmission queue is eligible for transmission.

In another aspect, transmission queues may be associated with a virtual machine, with a plurality of virtual machines being assigned to a hypervisor for regulating the transmission of queues from the virtual machines. In one example, some packets to be transmitted from a virtual machine may be rate-limited separately from those transmission queues that are rate-limited by the NIC. In particular, a hypervisor may use software-based rate-limiting for at least some of the packets that are to be transmitted by the virtual machine. However, a second-level rate limiter may then be used to enforce an aggregate rate limit on all packets sent by a particular virtual machine.

In yet another aspect, the transmission queues may be associated with network users that are not virtual machines. For example, the network users may include a number of different programs that are running on one or more computing devices. At least some of the programs may be collected into program groups. Each program may be assigned a first-level rate limit, while each program group may be assigned a second-level (group) rate limit. Accordingly, while certain systems described below refer to network users that are virtual machine environment, the disclosure may be similarly used in connection with a non-virtual machine environment.

Figure 1:
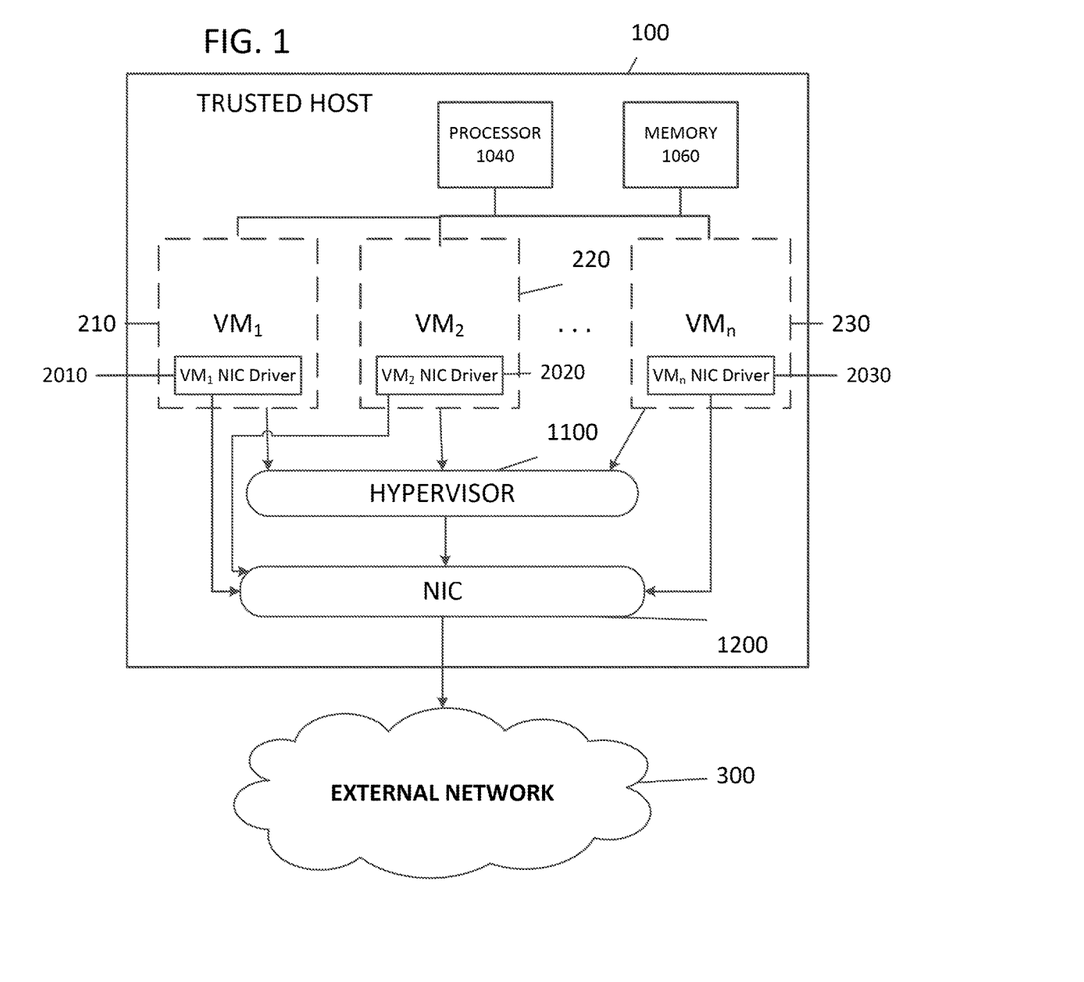
FIG. 1 is a schematic of a host in accordance with aspects of the disclosure.

FIG. 1 illustrates a virtual machine (VM) environment where the virtual machines (VMs) may transmit packets to an external network using two levels of rate limiters. In this regard, the VM environment may include at least one trusted host 100 connected to an external network 300. Although only one trusted host 100 is shown in FIG. 1, several trusted hosts may exist in a data center or server farm. The trusted host may include a plurality of virtual machines (VMs) 210, 220, and 230, a hypervisor 1100, and a network interface controller (NIC) 1200. The trusted host 100 may also include at least one processor 1040 and at least one memory 1060.

The trusted host 100 may be any type of computing device capable of hosting VMs. In this regard, the trusted host 100 may be a server, such as one located in a server farm or a data center. The processor 1040 of the trusted host 100 may be any conventional processor. Alternatively, the processor may be a dedicated controller such as an application specific integrated circuit (ASIC), field programmable gate array (FPGA), etc. Additionally, the processor 1040 of the trusted host 100 may include multiple processors, multi-core processors, or a combination thereof. Accordingly, references to a processor will be understood to include references to a collection of processors or dedicated logic that may or may not operate in parallel.

The memory 1060 of the trusted host stores information accessible by the processor, including instructions and data that may be executed or otherwise used by the processor. The memory the trusted host may also store the trusted host's operating system and the hypervisor 1100. The memory 1060 may be of any type capable of storing information accessible by the processor, including a computer-readable medium, or other medium that stores data that may be read with the aid of an electronic device, such as a hard-drive, memory card, flash drive, ROM, RAM, DRAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

In operation, the trusted host 100 may run an operating system that manages the VMs. The operating system may include a hypervisor, such as hypervisor 1100, or a virtual machine manager (VMM). For the purposes of this application, hypervisor and VMM may be used interchangeably. Further, the operating system of the trusted host 100 may be any suitable operating system capable of supporting virtual machines.

The hypervisor 1100 may manage each VM such that the VMs appear to be isolated from one another. That is, each VM 210, 220, and 230 believes itself to be an independent machine with its own hardware resources. In this regard, the hypervisor 1100 may control the VMs access to the trusted host's resources (i.e. memory, network interface controller, etc.). The hypervisor 1100 may implement a hardware virtualization scheme that allocates hardware resources to the VMs as necessary. According to some examples, the NIC 1200 is one of the hardware resources that VMs 210, 220, and 230 interact with via the hypervisor 1100.

The VMs 210, 220, and 230 may be software implementations of a computer. That is, VMs 210, 220 and 230 may execute an operating system. While only three VMs are shown in the figures, any number of VMs may be supported by trusted host 100. The operating system of the various VMs 210, 220, and 230 may be the same operating system as the trusted host, but do not necessarily have to be. Moreover, the operating system of each VM may be different from other VMs.

Each VM may include its own virtual network interface controller (vNIC) 2010, 2020, and 2030. Each vNIC 2010, 2020, and 2030 may include a transmission look-up table (not shown). The vNICs may transmit and receive packets for the VM. The vNICs may format or otherwise prepare the packet for transmission on the external network 300.

External network 300 may comprise various configurations and use various protocols including the Internet, World Wide Web, intranets, virtual private networks, local Ethernet networks, private networks using communication protocols proprietary to one or more companies, cellular and wireless networks (e.g., WiFi), data center networks, and various combinations of the foregoing. Although only one trusted host is depicted in FIG. 1, a system may include a large number of connected computers, trusted hosts, and VMs.

In operation, the VMs 210, 220, and 230 of FIG. 1 communicate with other destinations (i.e., other VMs, physical machines, servers, storage arrays, etc.). For example, the vNIC 2010 receives a packet from the operating system of VM 210. As described in more detail below, these packets may be queued, grouped, and rate limited.

Figure 2:
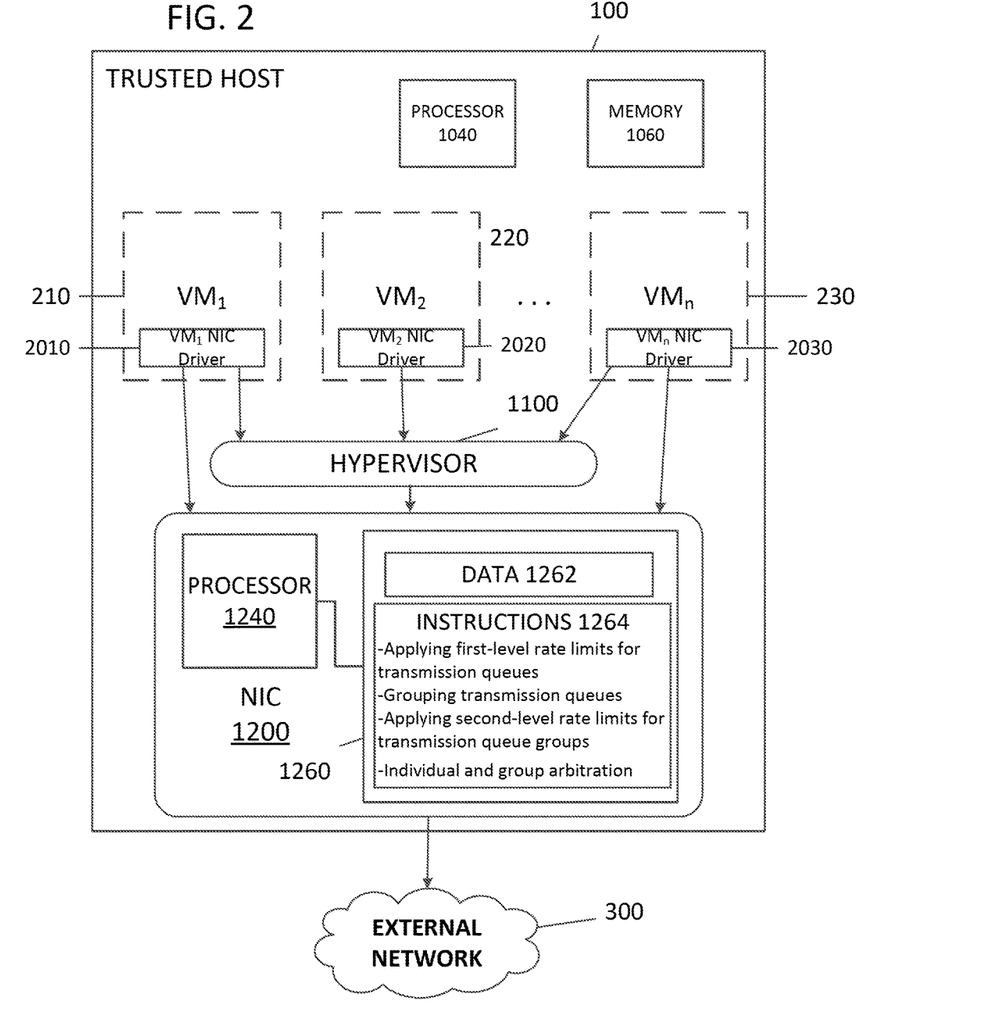
FIG. 2 is a schematic of virtual machines, hypervisor, and components of a NIC.

Turning to FIG. 2, a system for performing two levels of rate limiting is shown. The system includes a trusted host 100 and external network 300 as discussed above. Similarly, the trusted host 100 includes VM 210, VM 220, VM 230, a hypervisor 1100, as well as NIC 1200. Each VM may include its own virtual network interface controller (vNIC) 2010, 2020, and 2030. According to this example, NIC 1200 is shown with a processor 1240 and memory 1260, which may include data 1262 and instructions 1264. Processor 1240 may be one of the processors discussed above or a combination thereof. In other examples, the processor 1240 may be fixed-function hardware configured to perform the examples described herein. Additionally, memory 1260 may be any type of memory previously discussed or a combination thereof. While only one memory is shown in FIG. 2, the NIC 1200 may include additional memories of various types.

The instructions 1264 may be any set of instructions to be executed directly (such as machine code) or indirectly (such as scripts) by the processor 1240. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. The instructions may be executed to, for example, dequeue packets from the transmission queues, determine whether a packet is to be transmitted immediately or delayed, re-queuing packets on rate limited output queues when they are to be delayed, grouping transmission queues, applying second-level rate limits for the transmission queue groups, etc. Functions, methods and routines of the instructions are explained in more detail below.

The data 1262 may be retrieved, stored or modified by processor 1240 in accordance with the instructions 1264. For instance, although the system and method are not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

Figure 3:
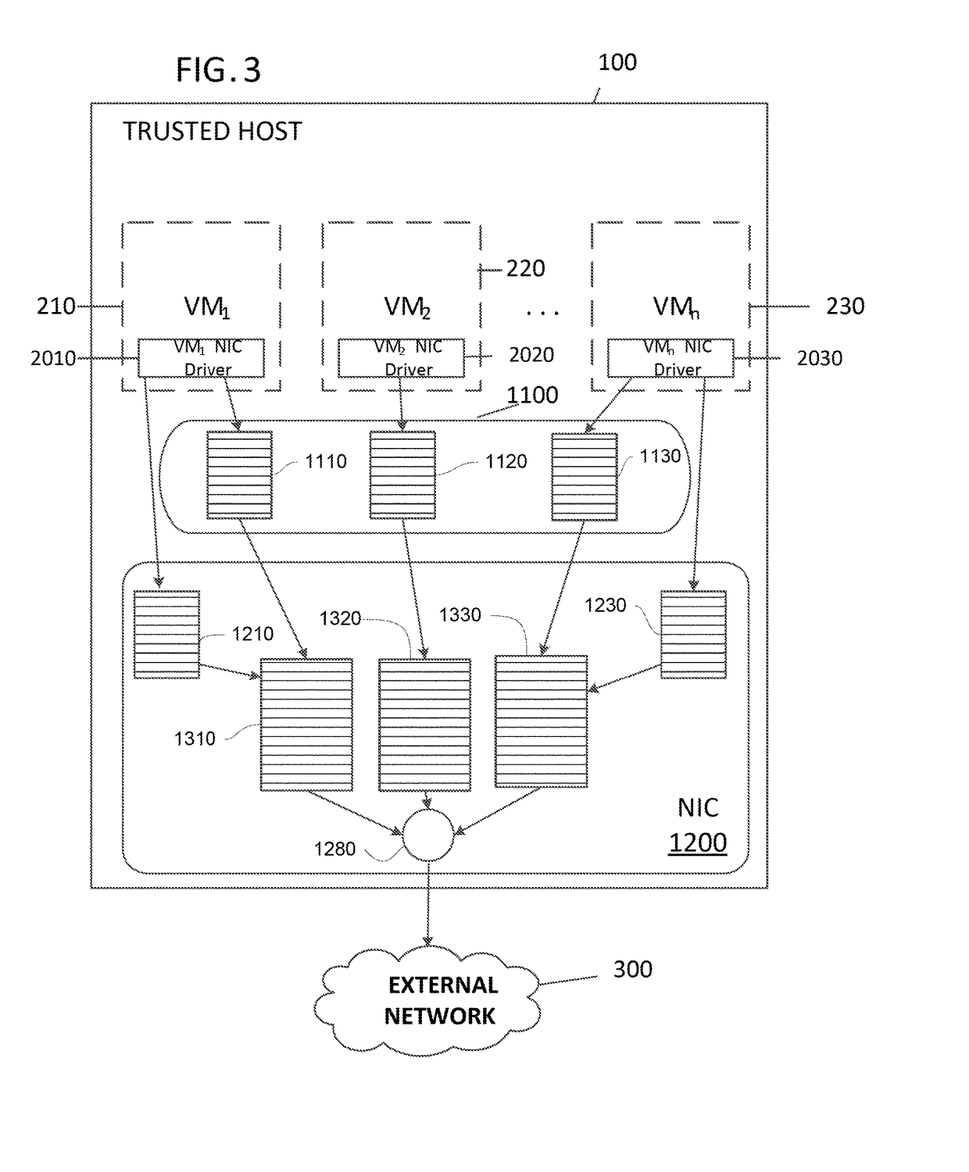
FIG. 3 shows an example of transmission queues being processed in accordance with aspects of the disclosure.

Turning to FIG. 3, an example of two level rate limiting is shown. Each VM 210, 220, and 230 may have a hypervisor-owned transmission queue in which hypervisor 1100 may transmit packets on behalf of the VM. For example, VM 210 may be assigned transmission queue 1110, while VM 220 is assigned transmission queue 1120, and VM 230 is assigned transmission queue 1130. In accordance with one aspect, hypervisor 1100 may software rate limit transmission queues 1110, 1120, and 1130 to perform a first-level rate limit of packets for multiple destinations on behalf of VMs 210, 220, and 230. In applying the first-level rate limit, hypervisor 1100 may determine a particular rate limit that is to be applied to each transmission queue 1110, 1120, and 1130. In particular, each VM 210, 220, and 230 may be assigned with its own first-level rate limit that hypervisor 1100 will be apply to transmission queues 1110, 1120, and 1130. For example, transmission queue 1110 of VM 210 may be provided with a first-level rate limit of 0.5 Gbits/sec, while transmission queue 1120 of VM 220 may be provided with a first-level rate limit of 0.7 Gbits/sec.

In addition to the hypervisor-owned transmission queues, VMs 210, 220, and 230 may also be allocated transmission queues that are first-level rate limited by NIC 1200. For example, transmission queue 1210 is associated with transmissions of VM 210, while transmission queue 1230 is associated with transmission of VM 230. NIC 1200 may then perform hardware first-level rate limits on each of transmission queues 1210 and 1230.

In accordance with one aspect of the disclosure, NIC 1200 may apply a second-level rate limit to transmission queues 1110, 1120, 1130, 1210, and 1230. The second-level rate limiting may be applied by grouping transmission queues together into group queue vectors and then applying a rate limit to each of the group queue vectors. For example, group queue vector 1310 of FIG. 3 corresponds to a grouping of transmission queues for VM 210, including transmission queues 1110 and 1210. Similarly, group queue vector 1330 corresponds to transmission queues of VM 230, including transmission queues 1130 and 1230, while group queue vector 1320 corresponds to transmission queues of VM 220.

NIC 1200 may then rate limit each group queue vector, so as to maintain an overall rate limit for the transmission queues that have been grouped together. This second-level rate limit may be set so that each VM does not exceed some predetermined bandwidth usage. In particular, the overall bandwidth usage for a VM may be restricted to a rate limit that is less than the summation of rate limits for all of the VM's transmission queues. For example, a VM may be allotted eight transmission queues, with each transmission queue having a 0.5 Gbit/sec rate limit. However, the VM's transmission queues may be assigned a second-level rate limit of only 2 Gbits/sec. In this way, each individual transmission queue for a VM may be given a relatively high first-level rate limit while still preventing a VM or some other network user from using too much bandwidth overall of the VM's transmission queues. A transmission queue arbiter, such as arbiter 1280, may then be used to determine the order in which packets from the VM's transmission queues and group queue vectors of are to be transmitted.

Figure 4:
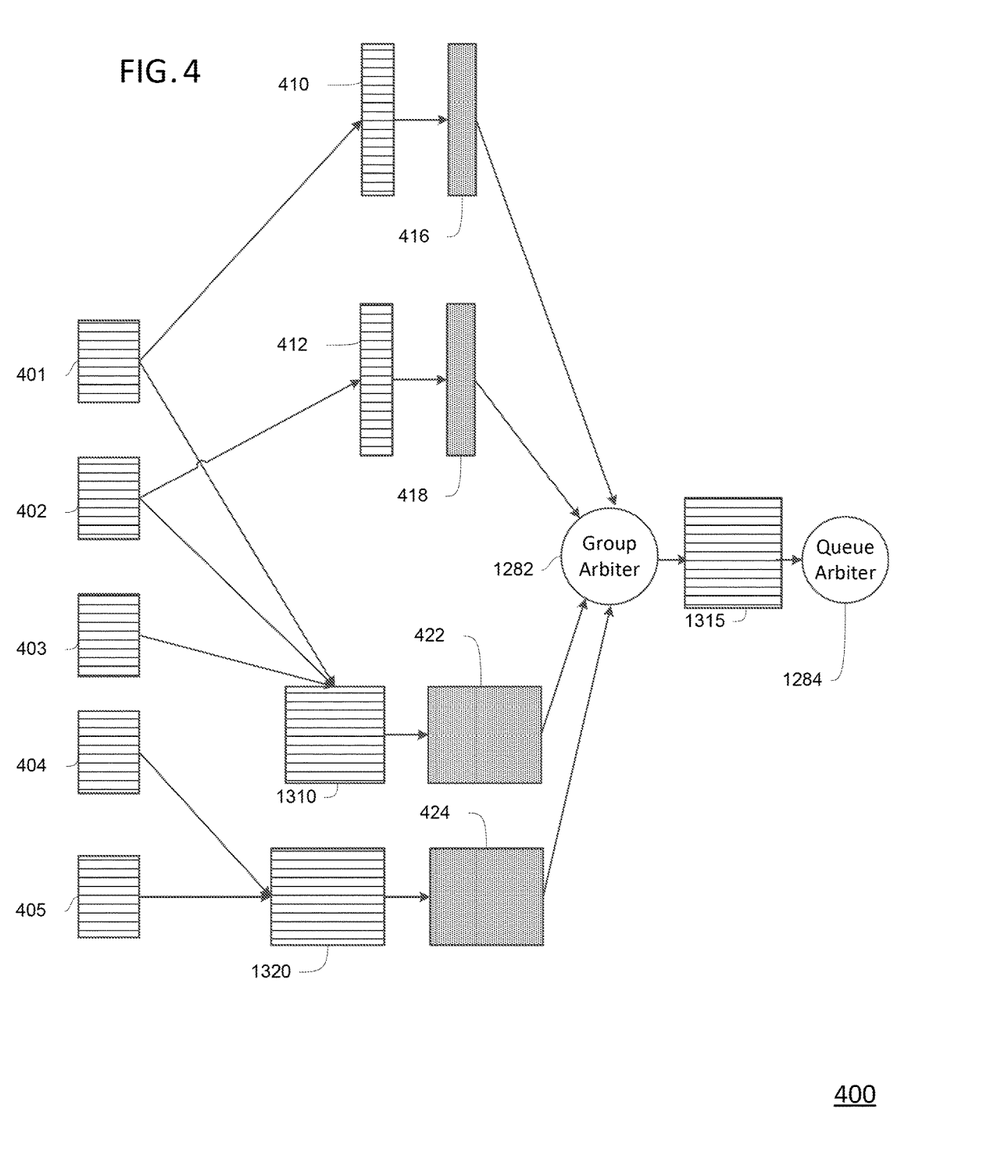
FIG. 4 shows a diagram of transmission queues being processed in accordance with aspects of the disclosure.

In performing two-level rate limiting, each transmission queue may be assigned two pointers, a first pointer to a first-level rate limiter and a second pointer to a second-level (group) rate limiter. FIG. 4 shows diagram 400 in which a NIC may implement pointers to perform two levels of rate limiting for VM transmission queues. In this example, transmission queues 401-405 may represent transmission queues of more than one VM for a particular trusted host. Specifically, transmission queues 401, 402, and 403 may be transmission queues associated with a first VM, while transmission queues 404 and 405 are associated with a second VM. As seen in FIG. 4, transmission queue 401 has a first pointer to transmission queue vector 410 and a second pointer to group queue vector 1310. Similarly, transmission queue 402 has a pointer to transmission queue vector 412 and group queue vector 1310. As described above, group queue vector 1310 may group together transmission queues of a particular VM, including transmission queues 401, 402, and 403. Accordingly, the transmission queues 401, 402, and 403 each have a pointer to the same group queue vector 1310. Similarly, both transmission queues 404 and 405 have pointers to group queue vector 1320.

Separate first-level rate limits may be applied to transmission queue vector 410 and transmission queue vector 412. For example, rate limiter 416 may apply a rate limit of 1 Gbit/sec to queue vector 410, while rate limiter 418 may apply a rate limit of 0.75 Gbit/sec to queue vector 412. In addition, a second-level (group) rate limit is applied to group queue vector 1310. For example, rate limiter 422 may apply a rate limit of 3 Gbit/sec to group queue vector 1310. Since group queue vector 1310 includes multiple transmission queues, including transmission queues 410, 402, and 403, group queue vector 1310 will not be within the rate limit established by rate limiter 422 unless the group of transmission queues, as a whole, are within the established rate limit. While group queue vector 1310 is shown as grouping the three transmission queues 401, 402, and 403, group queue vector 1310 may receive pointers from additional transmission queues that are not shown.

Packets from a transmission queue are not transmitted unless both the first-level rate limiter and the second-level rate limiter are each in a state indicating that the transmission queue is eligible for packet transmission. For example, transmission queue 401 is not eligible for packet transmission unless queue vector 410 is within the rate limit established by rate limiter 416 and group queue vector 1310 is within the rate limit established by rate limiter 422. If transmission queue 401 satisfies both the first-level and second-level rate limits, transmission queue packets may then be transmitted over a network. Before packets are transmitted, each transmission queue that satisfies the two levels of rate limiting may be subject to arbitration. It is not required that packets from transmission queues be transmitted in a particular order, such as in a first-in-first-out (FIFO). For example, group arbiter 1232 may select from group queue vectors 1310 and 1320 to determine which group queue vector is going to be first for packet transmission. The selected group queue vector 1315 may then be subject to queue arbitration, wherein queue arbiter 1234 determines the order in which packets within the transmission queue are be transmitted. In particular, the packets contained in group queue vector 1315 may then be transmitted in accordance with the arbitration policy enforced by queue arbiter 1234.

Various arbitration techniques may be used in accordance with the disclosed system. For example, group arbitration and queue arbitration may be performed using weighted round-robin queueing ("WRR") or deficit weighted round robin queueing ("DWRR"). Once a packet has been transmitted, the states of the corresponding first-level rate limiter and second-level rate limiter are updated to reflect the current transmission rates for the corresponding transmission queue vectors and group queue vectors. In one example, group arbiter 1232 and queue arbiter 1234 may be implemented as part of instructions 1264 shown in FIG. 2.

While FIG. 4 does not show pointers to first-level rate limiters from transmission queues 403, 404, and 405, it should be understood that transmission queues 403, 404, and 405 may each be assigned pointers to first-level rate limiters in a similar manner to that shown for transmission queues 401 and 402. As discussed above, the first-level rate limit may be implemented for some transmission queues by a hypervisor using software rate limiting, while other transmission queues may be rate limited solely by the NIC. Although diagram 400 shows the first-level and second-level rate limiters as operating in parallel, the rate limiters may also act in series, wherein the second-level rate limiter will only be applied for those transmission queues that are eligible for transmission under the first-level rate limit.

In one example, a particular group queue vector, such as group queue vector 1310, may contain an arbitrary number of transmission queues that are associated with more than one VM. The group queue vectors are also not required to group all transmission queues from a particular VM, as they may only group a subset of transmission queues that are to be transmitted by a particular VM. In accordance with one aspect, the grouping of transmission queues into group queue vectors may be performed based on transmission queue type. For example, group queue vector 1310 may group all transmission queues related to a particular application, or set of applications, that are running on the trusted host.

In another example, each transmission queue may be provided a minimum guaranteed transmission rate in addition to a maximum allowed transmission rate. In accordance with this example, NIC 1200 of FIG. 2 may include instructions 1264 that use two scheduling counters, such as two round-robin counters, to track whether a transmission queue should be sent as a minimum guaranteed packet or as an above minimum but below maximum packet.

Figure 5:
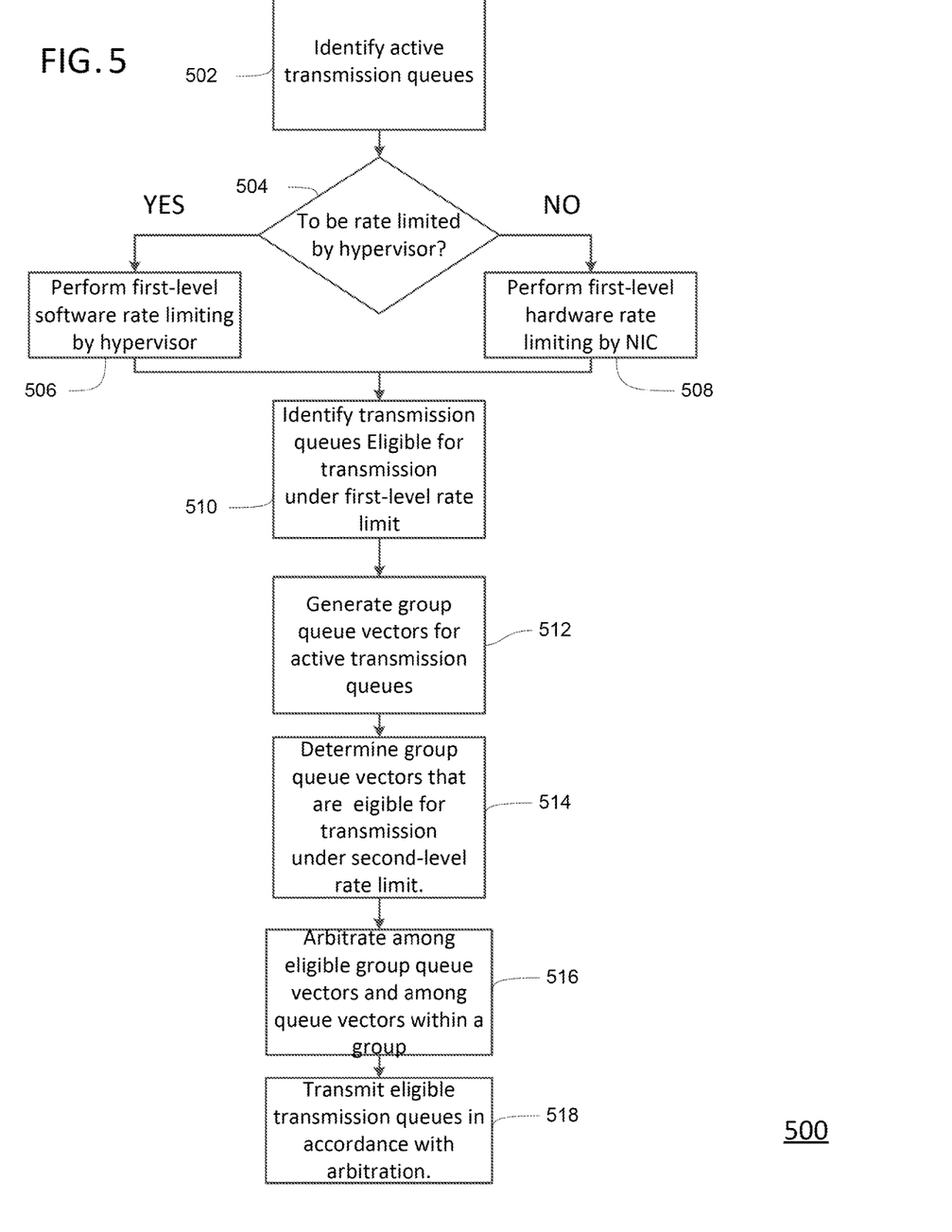
FIG. 5 shows a flowchart for the processing of transmission queue packets.

FIG. 5 shows a flowchart 500 that may be implemented by one or more network devices, including trusted host 100 of FIG. 1. In block 502, active transmission queues are identified. The active transmission queues may be those transmission queues that are subject to a transmission request for one or more packets to be transmitted by a VM. For each transmission queue, a determination may be made as to whether the transmission queue is to be rate limited by a hypervisor (Block 504). This determination may be made by the hypervisor, which instructs the vNIC driver to carry out the determination for packets within the transmission queues. As described in further detail below, the NIC may access a lookup table to determine whether the vNIC has designated each transmission queue for the appropriate form of rate limiting.

If a particular transmission queue is to be rate limited by the hypervisor, a pointer to a hypervisor-owned transmission vector may be used, and a first-level software rate limit may be applied to the hypervisor-owned transmission vector (Block 506). If a particular transmission queue is assigned to be rate limited by the NIC, rather than the hypervisor, a pointer to a NIC-owned transmission vector may be used, and a first-level hardware rate limit may be applied to the transmission vector (Block 508). Transmission queues that are eligible for transmission, based on the first-level rate limits applied by the hypervisor or NIC, may then be identified (Block 510). In block 512, group queue vectors may be generated for active transmission queues. For example, each group queue vector may contain some predefined or arbitrary number of transmission queues. For example, a particular group queue vector may receive pointers from all of the transmission queues of a particular VM. A determination may then be made as to whether the group queue vectors are eligible for transmission in accordance with a second-level rate limit (block 514). As set forth above, the second-level rate limit may be set at some predetermined rate that is less than the aggregate of the first-level rate limits of the transmission queues in the group queue vector. In block 516, arbitration of the eligible group queue vectors may occur, as well as arbitration of the transmission queues within a particular group. For example, WRR or DWRR arbitration may be used for group queue vector arbitration and individual transmission queue arbitration. Those transmission queues eligible for transmission under both the first-level rate limit and the second-level rate limit may then be transmitted in accordance with the determined arbitration (block 518).

While flowchart 500 shows blocks as occurring in a particular order, various blocks may be performed in parallel or in an alternate sequence in accordance with aspects of the disclosure. In addition, various blocks may be added or removed from flowchart 500 in accordance with aspects of the disclosure.

In one example, the NIC may dequeue packets from transmission queues and place the packet in a memory of the NIC, for example an SRAM buffer. In some examples, only a portion of the packet, such as the header, is placed in the searchable memory. The NIC may also perform a classification step of the packet located in the memory. In particular, a look-up key, such as a hash or normalized portion of the packet, may be used to find an entry in a transmission flow look-up table located on the NIC. If the packet or header information matches an entry in the transmission flow look-up table, the packet is enqueued on a specific first-level rate-limiting transmission queue as well as assigned to a group queue vector, as indicated in the matching entry. In this way, the NIC may have a plurality of transmission queues for each VM that are each associated with its own first-level rate limit and second-level rate limit. There may also be entries in the transmission flow look-up table that indicate that a packet is to be dropped, forwarded to the hypervisor, or transmitted immediately. If the look-up key does not match an entry in the transmission flow look-up table, the packet may either be dropped or routed to a hypervisor for further processing. In addition, NIC 1200 may make available a plurality of rate limited transmission queues to VMs by allocating the rate-limited transmission queues to the virtual machines as needed.

Returning to FIG. 3, each virtual machine may contain a virtual network interface controller (vNIC) 2010, 2020, and 2030 that includes the transmission look-up table (not shown). When the virtual machine transmits a packet, the vNIC may classify the packet according to the transmission look-up table. If an entry for the packet exists in the vNIC's transmission look-up table, the vNIC may bypass the hypervisor and enqueue the packet on the appropriate rate limited hardware transmission queue of NIC 1200. If no entry exists, then the vNIC may transmit the packet to the hypervisor to be classified and transmitted.

The hypervisor-owned transmission queues 1110, 1120, and 1130 may each be allocated to handle a particular class of network traffic, a priority associated with the network traffic, or a specific destination (i.e. particular machines, another trusted host with a plurality of virtual machines, a storage area network, a specific data center, etc.) or any combination thereof. Further, the hypervisor owned transmission queues may be invisible to the VMs. That is, the VMs may not be able to directly access the hypervisor-owned transmission queues.

The hypervisor-owned transmission queues may be located in a high-speed volatile memory of the trusted host 100. This high-speed volatile memory may be dynamic random access memory (DRAM) or any suitable high-speed volatile memory. In this regard, the high-speed volatile memory may be capable of holding more than 10,000 rate limited transmission queues.

The transmission queues 1210 and 1230 that are assigned to NIC 1200 may be invisible to the VMs. These NIC-owned transmission queues, such as transmission queue 1210, may receive packets from their respective VMs, such as VM 210. The transmission queues may be first-in first-out type of queues, or another type of transmission queue, such as transmission ring buffers or last-in first-out queues.

The transmission flow look-up table may be any suitable table or database capable of indexing and storing information for classifying the appropriate rate limited transmission queue for the packet. In particular, the transmission flow look-up table may identify the first-level and second-level rate limits that are to be applied to a particular transmission queue. The transmission flow look-up table may be stored in a memory located on the NIC, such as a content addressable memory (CAM), ternary content addressable memory (TCAM), SRAM, DRAM, or any other suitable memory. In this regard, the transmission flow look-up may use the transmission flow look-up table to determine whether the flow look-up key is stored therein. Further, the transmission flow look-up table may include an entry indicating the priority or the class of traffic of the packet. This information may be used by NIC 1200 to determine whether the packet is to be transmitted immediately or enqueued and grouped into a group queue vector for rate limiting in a manner described above.

As stated above, the current disclosure may be used in systems and devices that do not run in a VM environment. For example, the transmission queues may be assigned to network users that include individual programs running on one or more devices, rather than VMs running in a virtual environment. In this example, the programs may use a base operating system kernel to perform software rate limiting. Accordingly, the hypervisor 1100 of FIG. 1 may be replaced with an operating system kernel. The operating system kernel may provide first-level rate limiting, second-level rate limiting, or both. In addition, at least some of the programs may have their transmission queues bypass the software rate limiting of the kernel so as to be hardware rate limited by the NIC. In this example, the NIC hardware may provide first-level rate limiting to protect the overall system from inadvertent or abusive over-use of kernel bypass facilities. As described above, the transmission queues for the programs may be assigned to group queue vectors, so as that the second-level rate limit may be applied. However, in accordance with the disclosure, at least some of the programs may be receiving only first-level rate limiting, or no rate limiting at all. In addition, a single program may be assigned multiple transmission queues, with each transmission queue having a particular first-level rate limit. This first-level rate limit may be based on priority or security characteristics of the data that is associated with the transmission queue. The transmission queues from a particular program may then be grouped together into a group queue vector, so that a second-level (group) rate limit may be applied to some or all of the transmission queues for that particular program.

Figure 6:
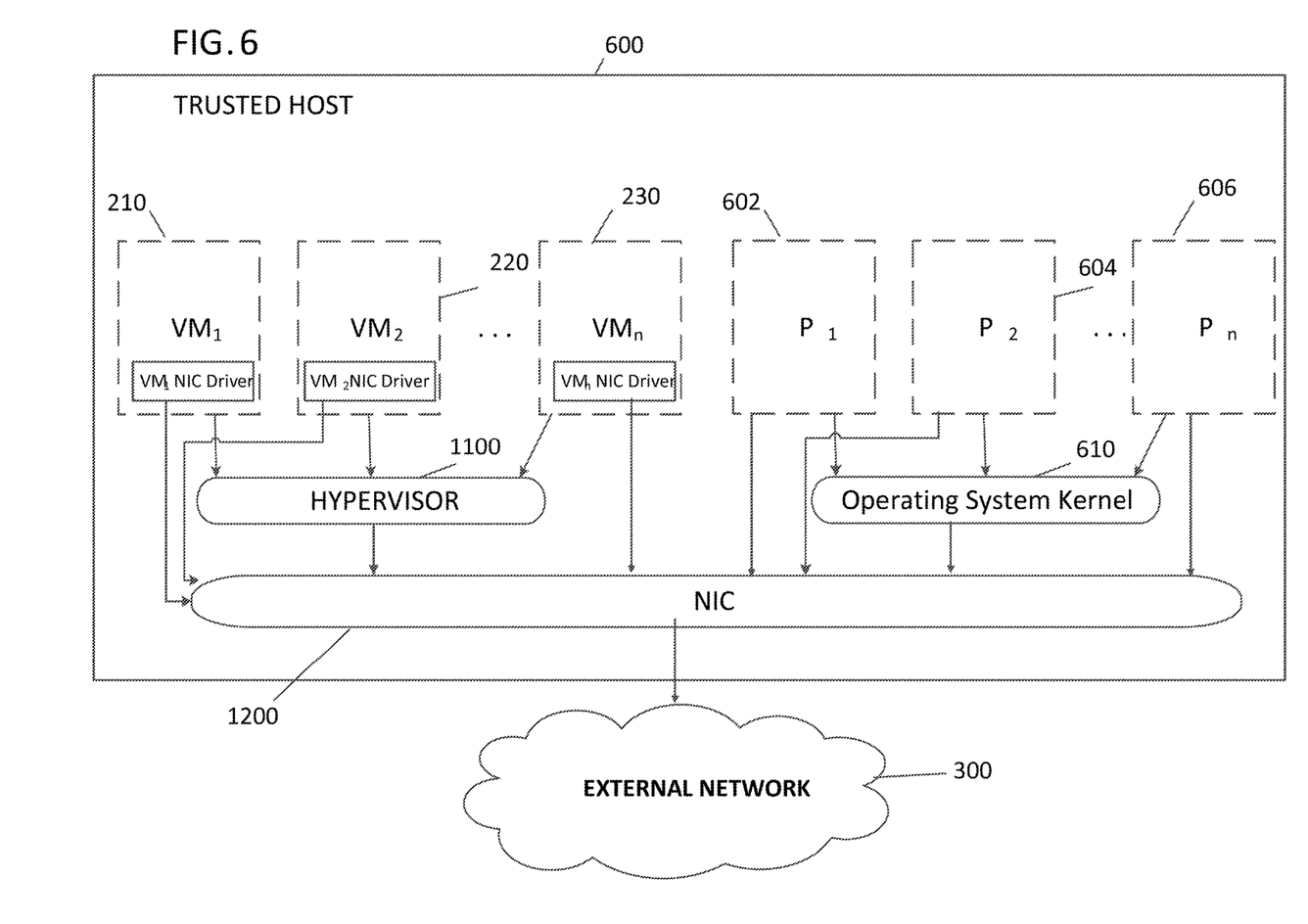
FIG. 6 is a schematic of a host in accordance with aspects of the disclosure.

In accordance with another aspect of the disclosure, the computing environment may contain multiple types of network users. For example, host 600 of FIG. 6 contains both virtual machines 210, 220, and 230, as well as individual programs 602, 604, and 606. VMs 210, 220, and 230 may communicate with hypervisor 1100 and NIC 1200 so that first-level and second-level rate limiting may be applied to the VMs' transmission queues in a manner described above. Similarly, programs 602, 604, and 606 may communicate with operating system kernel 610 and NIC 1200 so that first-level rate limiting and second-level rate limiting may be applied to the programs' transmission queues.

The foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
   receiving, by one or more processors, transmission requests for a plurality of transmission queues;
   assigning, by the one or more processors, a first set of transmission queues, from the plurality of transmission queues, to a first group of transmission queues;
   identifying, by the one or more processors, an individual bandwidth limit for each transmission queue in the first group of transmission queues;
   determining, by the one or more processors prior to transmitting packets from the first group of transmission queues, whether each transmission queue in the first group of transmission queues has a bandwidth within its identified individual bandwidth limit;
   identifying, by the one or more processors, a first group-level bandwidth limit for the first group of transmission queues wherein a summation of the individual bandwidth limits for the transmission queues in the first group of transmission queues is greater than the first group-level bandwidth limit;
   determining, by the one or more processors prior to transmitting packets from the first group of transmission queues, whether the first group of transmission queues has a total bandwidth that is within the first group-level bandwidth limit; and
   when the bandwidth for each transmission queue from the first group of transmission queues is within its individual bandwidth limit and when the first group of transmission queues has a total bandwidth that is within the first group-level bandwidth limit, providing, by the one or more processors, the first group of transmission queues for transmission.

2. The method of claim 1, further comprising:
   assigning, by the one or more processors, a second set of transmission queues, from the plurality of transmission queues, to a second group of transmission queues;
   identifying, by the one or more processors, an individual bandwidth limit for each of the transmission queues in the second group of transmission queues;
   determining, by the one or more processors, whether each transmission queue in the second group of transmission queues has a bandwidth that is within its identified individual bandwidth limit;
   identifying, by the one or more processors, a second group-level bandwidth limit for the second group of transmission queues;
   determining, by the one or more processors, whether the second group of transmission queues has a total bandwidth that is within the second group-level bandwidth limit; and
   when the bandwidth for each transmission queue from the first group of transmission queues is within the transmission queue's identified individual bandwidth limit and when the total bandwidth of the second group of transmission queues is within the second group-level bandwidth limit, providing, by the one or more processors, the second group of transmission queues for transmission.

3. The method of claim 2, wherein the first group of transmission queues is associated with a first network user, and wherein the second group of transmission queues is associated with a second network user.

4. The method of claim 2, wherein the first group of transmission queues contains a different number of transmission queues than the second group of transmission queues.

5. The method of claim 2, further comprising arbitrating, by the one or more processors, between the first group of transmission queues and the second group of transmission queues based on one of a weighted round robin (WRR) and deficit weighted round robin (DWRR).

6. The method of claim 2, wherein the first group of transmission queues is associated with a first virtual machine, and wherein the second group of transmission queues is associated with a second virtual machine.

7. The method of claim 1, wherein determining whether the bandwidth for each transmission queue from the first group of transmission queues is within its individual bandwidth limit further comprises assigning each transmission queue from the first group of transmission queues with a first pointer to a first-level rate limiter; and wherein determining whether the first group of transmission queues has a total bandwidth that is within the first group-level bandwidth limit further comprises assigning each transmission queue from the first group of transmission queues with a second pointer to a second-level rate limiter.

8. The method of claim 7, wherein the first-level rate limiter and the second-level rate limiter are NIC-implemented hardware.

9. The method of claim 7, wherein:
at least a first transmission queue from the plurality of transmission queues is assigned a software implemented first-level rate limiter,
at least a second transmission queue from the plurality of transmission queues is assigned to a hardware implemented first-level rate limiter, and
the first transmission queue and second transmission queue are assigned to the first group of transmission queues.

10. A system comprising:
one or more memories for storing a plurality of transmission queues; and
one or more processors in communication with the one or more memories, the one or more processors configured to:
receive transmission requests for a plurality of transmission queues;
assign a first set of transmission queues, from the plurality of transmission queues, to a first group of transmission queues;
identify an individual bandwidth limit for each transmission queue in the first group of transmission queues;
determine, prior to transmitting packets from the first group of transmission queues, whether each transmission queue in the first group of transmission queues has a bandwidth that is within its identified individual bandwidth limit;
identify a first group-level bandwidth limit for the first group of transmission queues wherein a summation of the individual bandwidth limits for the transmission queues in the first group of transmission queues is greater than the first group-level bandwidth limit;
determine, prior to transmitting packets from the first group of transmission queues, whether the first group of transmission queues has a total bandwidth that is within the first group-level bandwidth limit; and
when the bandwidth for each transmission queue from the first group of transmission queues is within its individual bandwidth limit and when the first group of transmission queues has a total bandwidth that is within the first group-level bandwidth limit, provide the first group of transmission queues for transmission.

11. The system of claim 10, wherein the one or more processors are further configured to:
assign a second set of transmission queues, from the plurality of transmission queues, to a second group of transmission queues;
identify an individual bandwidth limit for each of the transmission queues in the second group of transmission queues;
determine whether each transmission queue in the second group of transmission queues has a bandwidth that is within its identified individual bandwidth limit;
identify a second group-level bandwidth limit for the second group of transmission queues;
determine whether the second group of transmission queues has a total bandwidth that is within the second group-level bandwidth limit; and
if the bandwidth for each transmission queue from the first group of transmission queues is within the transmission queue's identified individual bandwidth limit and if the total bandwidth of the second group of transmission queues is within the second group-level bandwidth limit, provide the second group of transmission queues for transmission.

12. The system of claim 11, wherein the first group of transmission queues contains a different number of transmission queues than the second group of transmission queues.

13. The system of claim 11, wherein the one or more processors are configured to arbitrate between the first group of transmission queues and the second group of transmission queues.

14. The system of claim 11, wherein the first group of transmission queues is associated with a first virtual machine, and wherein the second group of transmission queues is associated with a second virtual machine.

15. The system of claim 10, wherein determining whether the bandwidth for each transmission queue from the first group of transmission queues is within the transmission queue's individual bandwidth limit further comprises assigning each transmission queue from the first group of transmission queues with a first pointer to a first-level rate limiter; and wherein determining whether the first group of transmission queues has a total bandwidth that is within the first group-level bandwidth limit further comprises assigning each transmission queue from the first group of transmission queues with a second pointer to a second-level rate limiter.

16. The system of claim 15, wherein the first-level rate limiter and the second-level rate limiter are NIC-implemented hardware.

17. The system of claim 15, wherein:
at least a first transmission queue from the plurality of transmission queues is assigned a software implemented first-level rate limiter,
at least a second transmission queue from the plurality of transmission queues is assigned to a hardware implemented first-level rate limiter, and
the first transmission queue and second transmission queue are assigned to the first group of transmission queues.

18. A non-transitory computer readable medium comprising instructions, that when executed by one or more processors:
receive transmission requests for a plurality of transmission queues;
assign a first set of transmission queues, from the plurality of transmission queues, to a first group of transmission queues;
identify an individual bandwidth limit for each transmission queue in the first group of transmission queues;
determine, prior to transmitting packets from the first group of transmission queues, whether each transmission queue in the first group of transmission queues has a bandwidth that is within its identified individual bandwidth limit;
identify a first group-level bandwidth limit for the first group of transmission queues wherein a summation of the individual bandwidth limits for the transmission queues in the first group of transmission queues is greater than the first group-level bandwidth limit;
determine, prior to transmitting packets from the first group of transmission queues, whether the first group of transmission queues has a total bandwidth that is within the first group-level bandwidth limit; and
when the bandwidth for each transmission queue from the first group of transmission queues is within the transmission queue's individual bandwidth limit and when the first group of transmission queues has a total bandwidth that is within the first group-level bandwidth limit, provide the first group of transmission queues for transmission.

19. The non-transitory computer readable medium of claim 18, further comprising instructions that when executed by the one or more processors:
assign a second set of transmission queues, from the plurality of transmission queues, to a second group;
identify an individual bandwidth limit for each of the transmission queues in the second group of transmission queues;
determine whether each transmission queue in the second group of transmission queues has a bandwidth that is within the transmission queue's identified individual bandwidth limit;
identify a second group-level bandwidth limit for the second group of transmission queues;
determine whether the second group of transmission queues has a total bandwidth that is within the second group-level bandwidth limit; and
when the bandwidth for each transmission queue from the first group of transmission queues is within the transmission queue's identified individual bandwidth limit and when the total bandwidth of the second group of transmission queues is within the second group-level bandwidth limit, provide the second group of transmission queues for transmission.

* * * * *